US008666309B2

(12) United States Patent
Hottinen et al.

(10) Patent No.: US 8,666,309 B2
(45) Date of Patent: Mar. 4, 2014

(54) SYSTEM FOR DISTRIBUTED BEAMFORMING FOR A COMMUNICATION SYSTEM EMPLOYING RELAY NODES

(75) Inventors: Ari Hottinen, Espoo (FI); Peter Fertl, Vienna (AT)

(73) Assignee: Nokia Corporation, Espoo (FI)

( * ) Notice: Subject to any disclaimer, the term of this patent is extended or adjusted under 35 U.S.C. 154(b) by 502 days.

(21) Appl. No.: 12/864,609

(22) PCT Filed: Jan. 28, 2008

(86) PCT No.: PCT/IB2008/050301
§ 371 (c)(1),
(2), (4) Date: Jul. 26, 2010

(87) PCT Pub. No.: WO2009/095744
PCT Pub. Date: Aug. 6, 2009

(65) Prior Publication Data
US 2010/0304666 A1 Dec. 2, 2010

(51) Int. Cl.
H04B 7/14 (2006.01)
(52) U.S. Cl.
USPC ............... 455/7; 455/11.1; 455/13.1; 455/69; 370/315
(58) Field of Classification Search
USPC .......... 455/7, 13.1, 13.4, 69, 522, 509, 562.1, 455/500, 553.1, 132, 101, 133, 24, 11.1, 25, 455/9, 67.11, 561, 63.4, 272, 276.1; 370/315, 316, 318, 329, 482; 375/267
See application file for complete search history.

(56) References Cited

U.S. PATENT DOCUMENTS

| 4,283,795 | A | * | 8/1981 | Steinberger | 455/283 |
| 6,671,499 | B1 | * | 12/2003 | Ylitalo et al. | 455/101 |
| 6,812,824 | B1 | * | 11/2004 | Goldinger et al. | 340/10.1 |
| 6,842,632 | B2 | * | 1/2005 | Raghothaman et al. | 455/562.1 |
| 6,952,455 | B1 | * | 10/2005 | Banister | 375/267 |
| 7,224,758 | B1 | * | 5/2007 | Banister | 375/358 |
| 8,086,174 | B2 | * | 12/2011 | Mohebbi | 455/11.1 |

(Continued)

FOREIGN PATENT DOCUMENTS

EP 1638236 A 3/2006
WO 2006088400 A 8/2006

OTHER PUBLICATIONS

Bolcskei et al., "Capacity scaling laws in MIMO relay networks", IEEE Trans. Wireless Comm., vol. 5, pp. 1433-1444, Jun. 2006.

(Continued)

Primary Examiner — Tan Trinh
(74) Attorney, Agent, or Firm — Harrington & Smith

(57) ABSTRACT

In accordance with aspects of the present invention, a method, apparatus and system for learning antenna weighting factors in a communication system including relay nodes. In one embodiment, an apparatus (e.g., a relay node (325)) for use with a communication system includes a first antenna (330) configured to receive a first signal including a pilot training sequence from a source node (305) and a second signal including a power-based feedback signal or a signal-to-noise based feedback signal from a destination node (350). The apparatus also includes a second antenna (335) configured to transmit at least a portion of the first signal with an antenna weighting factor (e.g., a perturbed antenna weighting factor). The apparatus further includes an antenna weighting factor module (340) coupled to the first antenna (330) and configured to iteratively adjust the antenna weighting factor in response to the second signal.

20 Claims, 7 Drawing Sheets

(56) References Cited

U.S. PATENT DOCUMENTS

| | | | | |
|---|---|---|---|---|
| 2003/0003873 | A1* | 1/2003 | Raghothaman | 455/67.1 |
| 2004/0102157 | A1* | 5/2004 | Lewis | 455/63.4 |
| 2006/0003697 | A1* | 1/2006 | Asai et al. | 455/11.1 |
| 2007/0191067 | A1 | 8/2007 | Nguyen et al. | |
| 2007/0207730 | A1 | 9/2007 | Nguyen et al. | 455/39 |
| 2008/0165720 | A1* | 7/2008 | Hu et al. | 370/315 |
| 2008/0225775 | A1* | 9/2008 | Proctor et al. | 370/315 |
| 2008/0285595 | A1* | 11/2008 | Chester et al. | 370/482 |
| 2008/0305805 | A1* | 12/2008 | Mondal et al. | 455/446 |
| 2009/0036114 | A1* | 2/2009 | Mohebbi | 455/422.1 |
| 2009/0061939 | A1* | 3/2009 | Andersson et al. | 455/562.1 |
| 2009/0080558 | A1* | 3/2009 | An | 375/267 |
| 2010/0054180 | A1* | 3/2010 | Eldering | 370/328 |
| 2010/0214964 | A1* | 8/2010 | Larsson et al. | 370/277 |
| 2010/0272005 | A1* | 10/2010 | Larsson et al. | 370/315 |
| 2012/0100802 | A1* | 4/2012 | Mohebbi | 455/15 |

OTHER PUBLICATIONS

Morgenshtern et al., "Crystallization in large wireless networks." IEEE Trans. on Information Theory, vol. 53, No. 10, Oct. 2007.

Banister et al., "Feedback assisted stochastic gradient adaptation of multiantenna transmission," IEEE Trans. Wireless Comm., vol. 4, pp. 1121-1135, May 2005.

Raghothaman, "Deterministic perturbation gradient approximation for transmission subspace tracking in FDD-CDMA," in Proc. IEEE ICC-2003, vol. 4, pp. 2450-2454, May 2003.

Nguyen et al., "Quantized-feedback optimal adaptive beamforming for FDD systems," in Proc. IEEE ICC-2006, vol. 9, pp. 4202-4207, Jun. 2006.

Mudumbai et al., "Distributed transmit beamforming using feedback control," Arxiv preprint cs.IT/0603072, Mar. 2006.

Mudumbai, "On the feasability of distributed beamforming in wireless networks," IEEE Trans. Wireless Comm., vol. 6, pp. 1-10, Apr. 2007.

International Search Report and Written Opinion of the International Searching Authority received from PCT Application No. PCT/IB2008/050301, dated Nov. 18, 2008, 15 pages.

Fan et al., "MIMO Configurations for Relay Channels: Theory and Practice" IEEE Transactions on Wireless Communications, IEEE Service Center, New Jersey, vol. 6, No. 5, May 1, 2007, pp. 1774-1786.

Larsson, Peter, et al., "Large-Scale Cooperative Relaying Network with Optimal Coherent Combining under Aggregate Relay Power Constraints", Proc. Future Telecommunication Conference (FTC), 2003, 5 pgs.

* cited by examiner

SYSTEM FOR DISTRIBUTED BEAMFORMING FOR A COMMUNICATION SYSTEM EMPLOYING RELAY NODES

RELATED APPLICATION

This application was originally filed as PCT Application No. PCT/IB2008/050301 on Jan. 28, 2008, which is incorporated herein by reference in its entirety.

TECHNICAL FIELD

The present invention is directed, in general, to communication systems and, more particularly, to a method, apparatus and system for learning antenna weighting factors in a communication system including relay nodes.

BACKGROUND

The communication of information is a necessity of modern society, which is enabled through the operation of a communication system. Information is communicated between a sending station and a receiving station by way of a communication channel. The sending station, if necessary, converts the information into a form for communication over the communication channel. The receiving station detects and recovers the information for the benefit of a user. A wide variety of different types of communication systems have been developed and are regularly employed to effectuate communication between sending and receiving stations.

An exemplary communication system is a cellular communication system in which a communication channel is defined upon a radio link extending between sending and receiving stations. Cellular radio communication systems are amenable to implementation as mobile communication systems wherein radio links, rather than fixed, wireline connections, are employed to define communication channels.

Generally, a cellular communication system includes a network infrastructure that includes a plurality of base stations that are positioned at spaced-apart locations throughout a geographic area. Each of the base stations defines an area, referred to as a cell, from which the cellular communication system derives its name. The network infrastructure, of which the base stations form portions thereof, is coupled to a core network such as a packet data backbone or a public-switched telephone network. Communication devices such as computer servers, telephone stations, etc., are, in turn, coupled to the core network and are capable of communication by way of the network infrastructure and the core network. Portable transceivers, commonly referred to as mobile stations, communicate with the base stations by way of such radio links.

Information communicated over a radio link is susceptible to imperfect communication such as distortion resulting from nonideal communication conditions. Distortion causes the information delivered to a receiving station to differ from the corresponding information transmitted by the sending station. If the distortion is significant, the informational content cannot be accurately recovered at the receiving station. For instance, fading caused by multi-path transmission distorts information communicated over a communication channel. If the communication channel exhibits significant levels of fading, the informational content may not be recoverable.

Various techniques such as spatial diversity are employed to compensate for or otherwise overcome distortion introduced upon the information transmitted over a communication channel to a receiving station. Spatial diversity is typically created through the use at a sending station of more than one transmit antenna from which information is transmitted, thereby creating spatial redundancy therefrom. The antennas are typically separated by distances sufficient to ensure that the information communicated by respective antennas fades in a sufficiently uncorrelated manner. Additionally, a receiving station can sometimes use more than one receiving antenna, preferably separated by appropriate distances.

Communication systems that utilize both multiple transmitting antennas and multiple receiving antennas are often referred to as being multiple-input, multiple-output ("MIMO") systems. Communications in a MIMO system provide the possibility that higher overall communication performance of the system, relative to a conventional system, can be achieved. As a result, an increased number of users may be serviced or more data throughput may be provided with improved reliability for each user. The advantages provided through the use of spatial diversity are further enhanced if the sending station is provided with information about the state or performance of the communication channel between the sending and receiving stations.

In multiple antenna systems, an approach to increase the strength of a desired signal at the receiver is to make use of transmit beamforming. By coherently combining the signal transmitted from multiple transmit antennas, the signal-to-noise ratio ("SNR") at the receiver of a transceiver can be increased, which leads to significant performance gains. Moreover, this approach also provides communication benefits by exploiting transmit diversity. However, this usually requires knowledge of channel state information ("CSI") at the transmitter of a transceiver, which implies a high level of signaling/feedback overhead. The amount of feedback can be reduced by applying antenna weighting factors at the transmitter, and updating the antenna weighting factors using only limited feedback from the receiver. The feedback signal can be generated by perturbing the antenna weighting factors and estimating the impact of the perturbation at the receiver (e.g., by estimating the received signal power). The influence of the perturbation is then reflected in the feedback signal. This approach (which is also referred to as "subspace tracking") allows adaptive antenna weighting factor learning, and closely converges to the performance gains achieved by coherent received signal combining.

A sending station generally cannot measure channel characteristics of the communication channel directly, such as a channel correlation matrix representing a product of channel impulse response components for the multiple transmitting antennas. Thus, a receiving station typically measures the characteristics of the communication channel. In two-way communication systems, measurements made at a receiving station can be returned to the sending station to provide channel characteristics to the sending station. Communication systems that provide this type of information to multiple-antenna sending stations are referred to as closed-loop transmit diversity systems.

The feedback signal returned to the sending station (e.g., a base station) from the receiving station (e.g., a mobile station) is used to select or refine values of antenna weighting factors. The antenna weighting factors are values including amplitude and phase by which information signals coupled to individual antennas are weighted prior to their transmission over a communication channel to the mobile station. A goal is to weight the information signals applied to the antennas in amplitude and phase in a manner that best facilitates communication of the information to the receiving station. Estimation of the antenna weighting factors can be formulated as a transmission subspace tracking procedure. Several closed-loop transmit diversity procedures may be utilized.

A technique to improve reliability of communication between a sending station and a receiving station is to employ relay nodes ("RNs"), which may be fixed or mobile communication nodes that act as signaling relays to improve the reception of a weak or corrupted signal at a destination node. A relay node forwards a message from a source node ("SN"), which is a node that needs assistance from a relay node, to a destination node ("DN"), which is the node that finally receives the message that may be weak or otherwise corrupted. In general, the aforementioned communication devices (e.g., SN, DN, or RN) form wireless nodes.

In a system employing relay nodes, in a simple but illuminating example, the problem can be translated into coherently combining desired signals at the relay nodes. This is done by co-phasing the received signals with respect to the backward channel (e.g., the source-relay channel) and the forward channel (e.g., the relay-destination channel) as described by H. Bölcskei, et al., in the paper entitled "Capacity Scaling Laws in MIMO Relay Networks," IEEE Trans. Wireless Comm., Vol. 5, No. 6, pp. 1433-1444, June 2006, which is incorporated herein by reference. However, implementation of such a system to adjust antenna weighting factors requires feedback of the full CSI of the forward channel from the destination node to the relay nodes, which is clearly inefficient.

Several weighted transmission methods for a plurality of antennas have been studied in the past. However, efforts in this area have focused mainly on centralized antenna arrays, without the use of intervening relay nodes. In the paper by B. C. Banister, et al., entitled "Feedback Assisted Stochastic Gradient Adaptation of Multiantenna Transmission," IEEE Trans. Wireless Comm., Vol. 4, No. 3, pp. 1121-1135, May 2005, and in U.S. Pat. No. 6,952,455, entitled "Adaptive Antenna Method and Apparatus," by Bannister, Oct. 4, 2005, which are incorporated herein by reference, an iterative algorithm using one-bit feedback was described that uses random vector perturbations to achieve desired beamforming gains. In the paper by B. Raghothaman, entitled "Deterministic Perturbation Gradient Approximation for Transmission Subspace Tracking in FDD-CDMA," Proc. IEEE ICC-2003, Vol. 4, pp. 2450-2454, May 2003, and in U.S. Pat. No. 6,842,632, entitled "Apparatus, and Associated Method, for Facilitating Antenna Weight Selection Utilizing Deterministic Perturbation Gradient Approximation," by B. Raghothaman and R. T. Derryberry, Jan. 11, 2005, which are incorporated herein by reference, a similar approach utilizes a deterministic set of perturbation vectors. Both approaches are based on an adaptive gradient search technique and assume centralized antenna arrays, where the transmission weights are modified in the source transceiver.

As described in the paper by H. Nguyen and B. Raghothaman, entitled "Quantized-Feedback Optimal Adaptive Beamforming for FDD systems," Proc. IEEE ICC-2006, Vol. 9, pp. 4202-4207, June 2006, which is incorporated herein by reference, the adaption rate of antenna weighting factors can be influenced by changing the amount of feedback (i.e., the number of feedback bits). Recently, beamforming algorithms for distributed transmitters have been investigated as described by R. Mudumbai, et al., in the paper entitled "Distributed Transmit Beamforming Using Feedback Control," Arxiv preprint cs.IT/0603072, 2006, which is incorporated herein by reference. In the aforementioned paper, a virtual antenna array of sensors coherently transmits a common message to a base station. It is shown that coherent transmission can be achieved asymptotically by random phase perturbations at distributed transmitters. However, a relay arrangement including a relay node was not considered. In the above reference, the pilot signals are transmitted from the same spatial location where updating of antenna weighting factors is applied.

Considering the limitations as described above, a system and method to control antenna weighting factors for beamforming with multiple antennas employed in a wireless communication system including at least one source node, at least one relay node, and at least one destination node is not presently available. Accordingly, what is needed in the art is a system that learns real or complex antenna weighting factors for at least a subset of relay node antennas, preferably using low-rate feedback, overcoming many of the aforementioned limitations. In accordance therewith, a beamforming arrangement for multiple antennas in a communication system employing at least one source node, at least one relay node, and at least one destination node, that generates antenna weighting factors for beamforming of multiple relay node antennas would provide improved reliability of communication in a communication system.

SUMMARY OF THE INVENTION

These and other problems are generally solved or circumvented, and technical advantages are generally achieved, by embodiments of the present invention, which include a method, apparatus and system for learning antenna weighting factors in a communication system including relay nodes. In one embodiment, an apparatus (e.g., a relay node) for use with a communication system includes a first antenna configured to receive a first signal including a pilot training sequence from a source node and a second signal including a power-based feedback signal or a signal-to-noise based feedback signal from a destination node. The apparatus also includes a second antenna configured to transmit or relay at least a portion of the first signal with an antenna weighting factor (e.g., a perturbed antenna weighting factor). The first and second antennas may be antenna elements of a single antenna. The apparatus further includes an antenna weighting factor module coupled to the first antenna and configured to adjust the antenna weighting factor with a deterministic perturbation selected from an orthogonal vector set in response to the second signal. The antenna weighting factor module may also be configured to adjust the antenna weighting factor with a perturbation generated from a random Gaussian vector in response to the second signal. The antenna weighting factor module may iteratively adjust the antenna weighting factor over a sequence of adjustment steps. The apparatus still further includes a transmitter and receiver coupled to the first and second antennas.

In another aspect, an apparatus for use with a communication system includes means for receiving a first signal including a pilot training sequence from a source node and a second signal including a power-based feedback signal or a signal-to-noise based feedback signal from a destination node. The apparatus also includes means for transmitting at least a portion of the first signal with an antenna weighting factor. The apparatus further includes means for iteratively adjusting the antenna weighting factor with a deterministic perturbation over a sequence of adjustment steps in response to the second signal.

In another aspect, a method of operating a communication node includes receiving a first signal including a pilot training sequence from a source node and a second signal including a power-based feedback signal or a signal-to-noise based feedback signal from a destination node. The method also includes transmitting at least a portion of the first signal with a perturbed antenna weighting factor. The method further includes iteratively adjusting the antenna weighting factor with a deterministic perturbation selected from an orthogonal vector set over a sequence of adjustment steps in response to the second signal. The antenna weighting factor may also be adjusted with a perturbation generated from a random Gaussian vector in response to the second signal.

In another aspect, an apparatus for use with a communication system includes an antenna configured to receive a signal from first and second communication nodes and a feedback generator configured to transmit a feedback signal (e.g., a power-based feedback signal or a signal-to-noise based feedback signal) to at least one of the first and second communication nodes to adjust an antenna weighting factor of an antenna thereof. The apparatus may be a destination node and at least one of the first and second communication nodes may be relay nodes. The feedback generator may be configured to transmit the feedback signal to the first communication node and another feedback signal to the second communication node. In a related aspect, a method, a computer program product and means for performing the aforementioned functions are also provided herein.

In another aspect, a communication system includes a source node configured to transmit a first signal including a pilot training sequence and a destination node configured to transmit a second signal including a power-based feedback signal or a signal-to-noise based feedback signal. The communication system also includes a relay node (e.g., a mobile station) having a first antenna configured to receive the first signal and the second signal. The relay node also includes a second antenna configured to transmit at least a portion of the first signal with a perturbed antenna weighting factor. The relay node further includes an antenna weighting factor module coupled to the first antenna and configured to iteratively adjust the antenna weighting factor with a deterministic perturbation selected from an orthogonal vector set over a sequence of adjustment steps in response to the second signal. The antenna weighting factor module may also be configured to adjust the antenna weighting factor with a perturbation generated from a random Gaussian vector in response to the second signal. The relay node still further includes a transmitter and receiver coupled to the first and second antennas.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context of beamforming with multiple antennas in a wireless communication system including a source node, one or more relay nodes, and a destination node. In general, embodiments of the invention may be applied to any form of communication system and network such as a cellular wireless communication system and network. For additional information about beamforming systems, see a paper by V. I. Morgenshtern, et al., entitled "Crystallization in Large Wireless Networks," IEEE Trans. on Information Theory, Vol. 53, Iss. 10, October 2007, pp. 3319-3349, and U.S. Pat. No. 7,224,758, entitled "Multiple Transmit Antenna Weighting Techniques," by Bannister, May 29, 2007, and U.S. Patent Application Publication No. 2007/0191067, entitled "Adaptive Beamforming Systems and Methods for Communication Systems," by H. Nguyen and B. Raghothaman, Aug. 16, 2007, and a paper by R. Mudumbai, et al., entitled "On the Feasability of Distributed Beamforming in Wireless Networks," IEEE Trans. Wireless Comm., Vol. 6, No. 4, pp. 1-10, April 2007, which are incorporated herein by reference.

Figure 1:
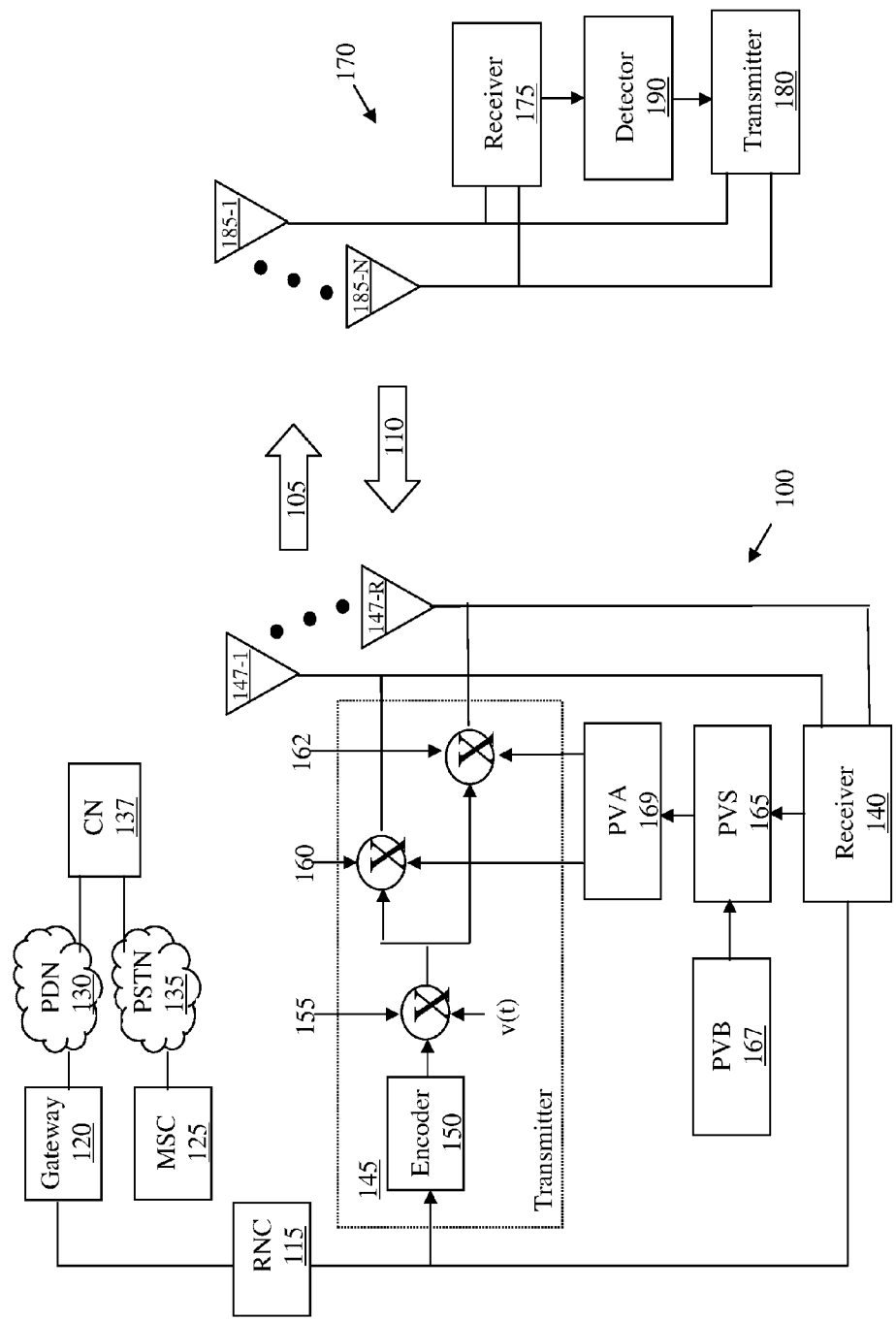
FIG. 1 illustrates a block diagram of an embodiment of a communication system that provides radio communication between communication stations via communication channels employing an exemplary beamforming arrangement that includes a deterministic perturbation gradient approximation to adjust antenna weighting factors.

Referring now to FIG. 1, illustrated is a block diagram of an embodiment of a communication system that provides radio communication between communication stations via communication channels employing an exemplary beamforming arrangement that includes a deterministic perturbation gradient approximation to adjust antenna weighting factors. The communication system includes a base station 100 as a source node and a mobile station 170 as a destination node. The communication channels are defined by radio links such as forward channel 105 and backward channel 110. Information sent to the mobile station 170 is communicated by the base station 100 over the forward channel 105 and information originated at the mobile station 170 for communication to the base station 100 is communicated over backward channel 110. The communication system may be a cellular communication system constructed pursuant to any of a number of different cellular communication standards. For instance, the base station and mobile station may be operable in a code division multiple access ("CDMA") communication system such as a third generation ("3G") CDMA communication.

The base station 100 forms part of a radio access network that also includes a radio network controller 115 coupled to a gateway 120 and a mobile switching center 125. The gateway 120 is coupled to a packet data network ("PDN") 130 such as the Internet, and the mobile switching center 125 is coupled to a public switched telephone network ("PSTN") 135. A correspondent node 137 is coupled to the packet data network 130 and to the PSTN 135. The correspondent node 137 represents a data source or a data destination from which, or to which, information is routed during operation of the communication system.

The base station 100 includes a receiver 140 and a transmitter 145. A forward-channel signal to be communicated by the base station 100 to the mobile station 170 is converted into a format for communication over the forward channel 105 by the transmitter 145. Closed-loop feedback information is returned by the mobile station 170 to the base station 100 by way of the backward channel 110. The mobile station 170 also includes a receiver 175 and a transmitter 180. The receiver 175 operates to receive, and operate upon, the forward-channel signals transmitted by the base station 100 over the forward channel 105, and the transmitter 180 operates to transmit backward-channel signals over the backward channel 110 to the base station 100.

The base station 100 and the mobile station 170 include multiple antennas, and the base station 100 and the mobile station 170 combination forms a multiple-input, multiple-output ("MIMO") system. For purposes of clarity, the base station 100 includes R base station antennas designated 147-1 to 147-R (hereinafter referenced as base station antennas 147). Also for purposes of clarity, the mobile station 170 includes N mobile station antennas designated 185-1 to 185-N (hereinafter referenced as mobile station antennas 185).

The base station transmitter 145 includes an encoder 150 that encodes data to form encoded data. The encoded data is provided to an up-mixer 155 with an up-mixing carrier v(t) to generate an up-mixed signal. The up-mixed signal is provided via antenna weighting elements (two of which are referenced and designated as first and second antenna weighting elements 160, 162, respectively) on separate branches to ones of the base station antennas 147. Once the up-mixed signals are weighted, the weighted signals are applied to the base station antennas 147 for transmission to the mobile station 170. Of course, other operations may be performed on the weighted signals prior to transmission to the mobile station 170. The base station transmitter 145 may also include a pilot signal source to generate a pilot training sequence to be transmitted wth the weighted signals.

The base station 100 also includes a deterministic perturbation gradient approximation system as an exemplary process to adjust the values of the antenna weightings applied to the first and second antenna weighting elements 160, 162 in a manner that enhances antenna weighting factor selection pursuant to a closed-loop transmit diversity system. The deterministic perturbation gradient approximation system (which may be embodied in hardware, software, or combinations thereof) includes a perturbation vector selector ("PVS") 165 that operates to select perturbation vectors formed of vector values (indicating a perturbed amplitude and phase) retrieved from a perturbation vector buffer ("PVB") 167. The perturbation vectors selected by the perturbation vector selector 165 are provided to a perturbation vector applicator ("PVA") 169 for application to the first and second antenna weighting elements 160, 162. The perturbation vectors perturb the weightings of the first and second antenna weighting elements 160, 162 and, in turn, the amplitude and phase of the signals transmitted by the base station's antennas 147. The forward-channel signals generated on the forward-link channels 105, weighted with the perturbation vectors, are delivered to the mobile station 170.

The mobile station 170 includes a detector 190 (which may be a subsystem of the receiver 175 and may also include a feedback generator) that detects and measures characteristics representing power levels of the perturbations of the forward-channel signals (again, weighted forward-channel signals) transmitted by the base station 100. The characteristics associated with the forward-channel signals are thereafter transmitted by the mobile station transmitter 180 to the base station 100. The characteristics are thereafter employed by the base station 100 to adjust the weightings of the first and second antenna weighting elements 160, 162 for the base station antennas 147 to refine the forward-channel signals.

The deterministic perturbation gradient approximation system operates to provide a deterministic perturbation gradient approximation that provides tracking of long-term feedback. Other arrangements to provide feedback to adjust antenna weighting elements are contemplated within the broad scope of the invention. For example, U.S. Patent Application Publication No. 2007/0207730, entitled "Adaptive Multi-Beamforming Systems and Methods for Communication Systems," by Nguyen, et al., Sep. 6, 2007, which is incorporated herein by reference, describe an antenna weighting element adjustment procedure.

Figure 2:
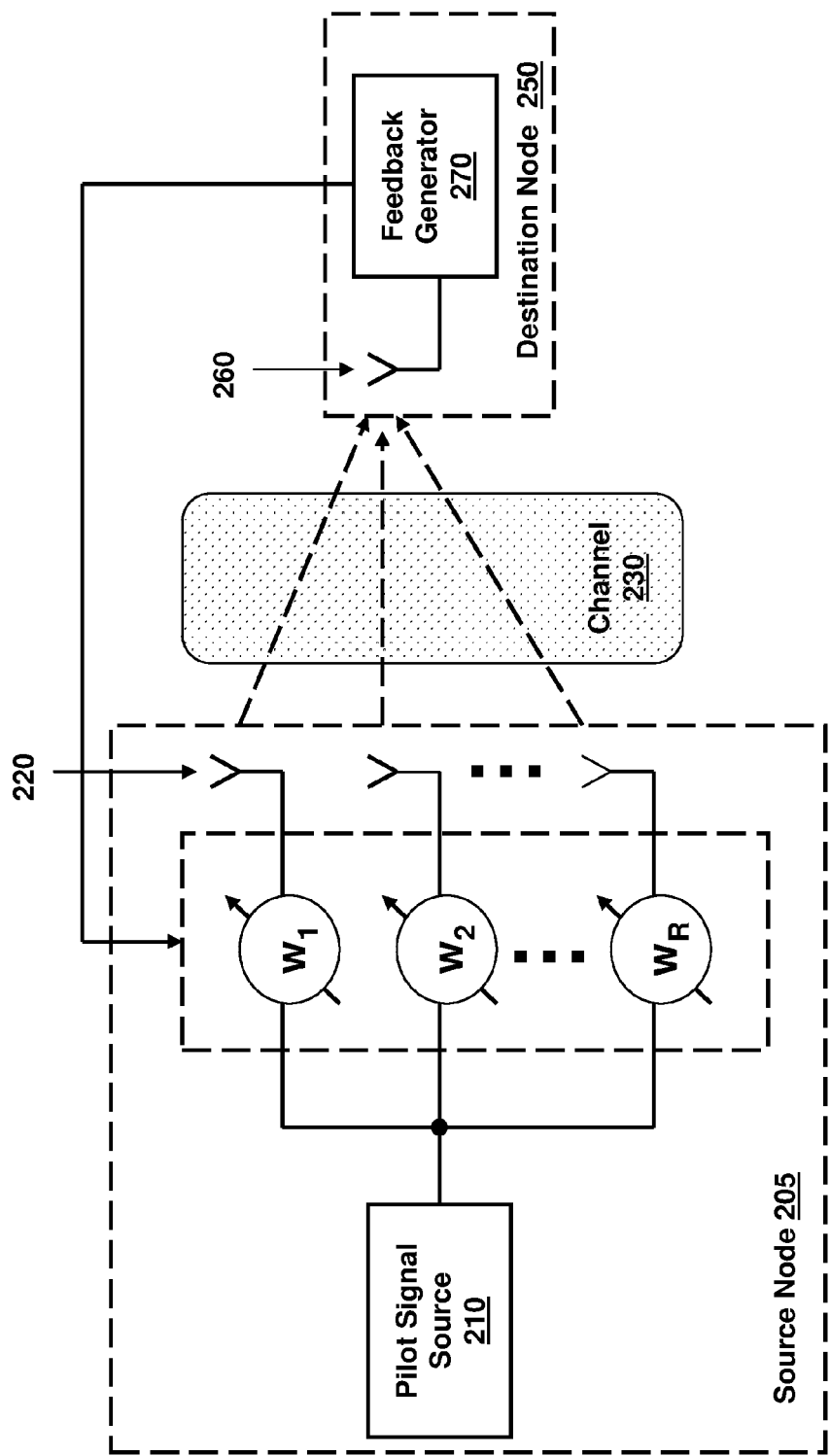
FIG. 2 illustrates a system level diagram of a wireless communications system including a source node with one or more antennas controlled by antenna weighting factors, and a destination node providing feedback to adjust the antenna weighting factors.

Turning now to FIG. 2, illustrated is a system level diagram of a wireless communications system including a source node 205 with one or more antennas controlled by antenna weighting factors, and a destination node providing feedback to adjust the antenna weighting factors. The source node 205 includes R antennas 220, such as antenna 220, each antenna controlled with antenna weighting factors $w_i$, i=1, . . . , R. The wireless communication system further includes a destination node, such as destination node 250. The source node antennas 220 radiate through a channel 230 to an antenna 260 at the destination node 250. In this wireless communications system, pilot symbols or a pilot training sequence from pilot signal source 210 at the source node 205 are transmitted from a physical location which is the same as that where application of antenna weighting factors takes place. An adaptive feedback generator 270 located in destination node 250 generates a feedback signal to adjust antenna weighting factors at a source node 205.

There is no restriction to a particular way of adapting the antenna weighting factors. In fact, any scheme of adapting antenna weighting factors can be used for this purpose. The relay nodes may or may not cooperate in knowing each others adjusted antenna weights or (relative) transmission power and, thus, may or may not include this cooperative knowledge in an antenna weighting factor update procedure. Perturbations to antenna weighting factors and the resulting control can be defined so that the adaptation method is insensitive to the number of relay nodes, making the system easily scalable and used.

Figure 3:
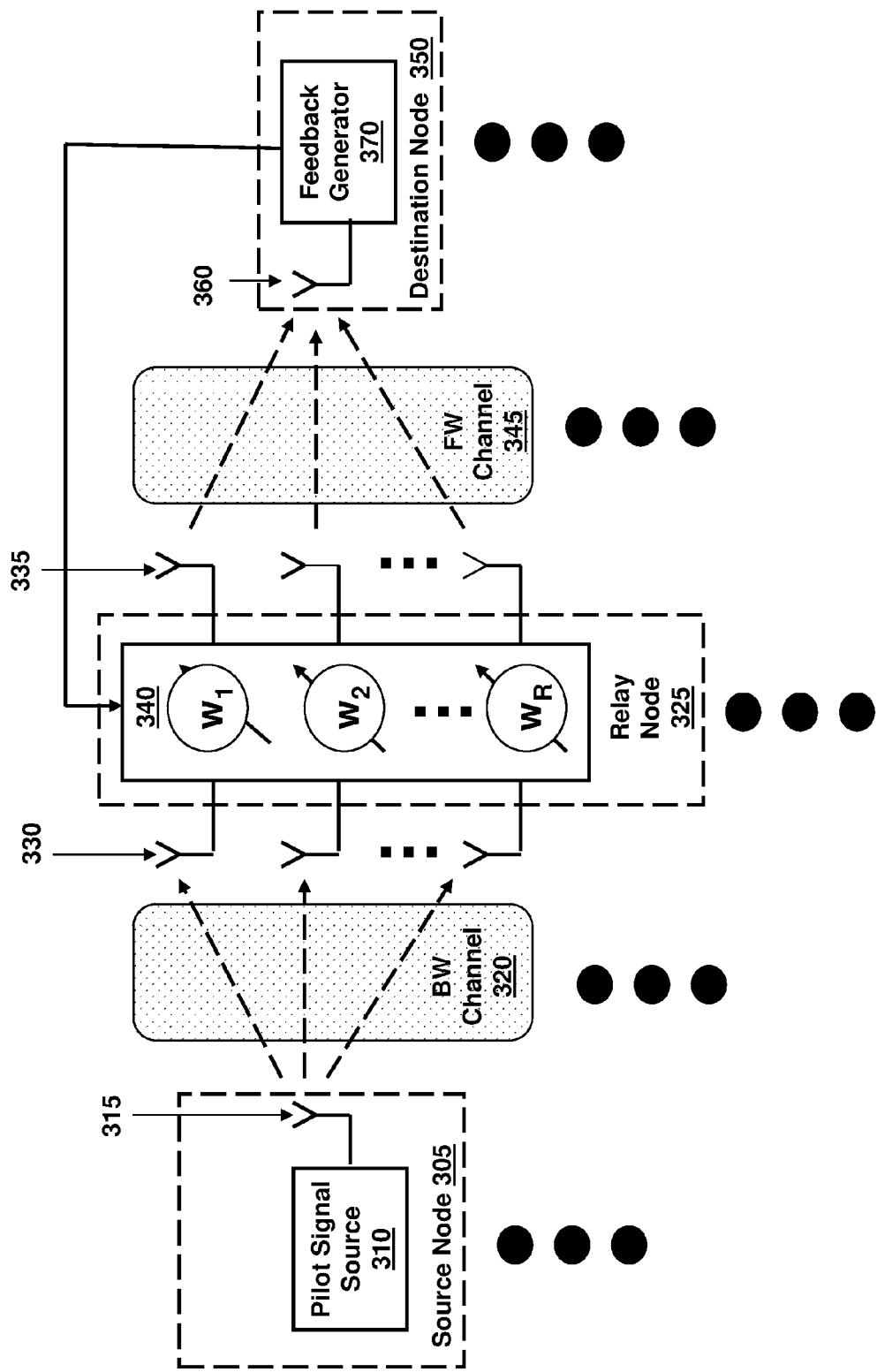
FIG. 3 illustrates a system level diagram of a wireless communication system including a source node, a relay node with antennas controlled by antenna weighting factors, and a destination node providing feedback to adjust the antenna weighting factors.

Turning now to FIG. 3, illustrated is a system level diagram of a wireless communication system including a source node 305, a relay node 325 with antennas controlled by antenna weighting factors, and a destination node 350 providing feedback to adjust the antenna weighting factors. The source node 305 may have one or more transmitting antennas, such as transmitting antenna 315. The transmitting antenna(s) 315 at the source node 305 radiate through a backward channel 320 to one or more receiving antennas, such as receiving antenna 330 at one or more relay nodes, such as relay node 325. The relay nodes 325 include transmitting antennas, such as transmitting antenna 335. The transmitting antennas 335 at a relay node 325 are controlled with R antenna weighting factors, $w_i$, i=1, ..., R. Of course, a receiving antenna and a transmitting antenna may be realized as antenna elements of a single antenna, and when they are separate, antenna weighting factors for receiving antennas may also be controlled. The antenna weighting factors $w_i$ are controlled by an antenna weighting factor module 340. The transmitting antennas 335 at a relay node 325 radiate through a forward channel 345 to a receiving antenna, such as receiving antenna 360, at a destination node, such as destination node 350. The source node 305 employs pilots symbols or pilot training sequences generated in a pilot signal source 310 that are radiated from one or more source node antennas 315.

The wireless communications system applies antenna weighting factor adjustments at one or more relay nodes that are physically separate from a source node, determines effectiveness of the antenna weighting factor perturbations at a destination node 350, signals information (e.g., a feedback signal) related to effectiveness of the perturbations via an adaptive feedback generator 370 of the destination node 350 to the relay nodes 325, and adjusts the antenna weighting factors by an antenna weighting factor module 340 at the relay nodes 325. At least three communication nodes are thus employed, one of which is a relay node that has a wireless channel to a source node and to a destination node. With a relay node, the antenna weighting factor can enable improved signal reception, via coherent phasing or/and power allocation, also when a direct link exists from the source node to the destination node.

It is understood that even though the aforementioned FIGURES show the components of the communication nodes discussed above as separate components, any of the components may be integrated together or may be provided as subcomponents of other components. The functionality described above can be advantageously implemented as software modules stored in a non-volatile memory, and executed as needed by a processor, after copying all or part of the software into executable random access memory. Alternatively, the logic provided by such software can also be provided by an application specific integrated circuit. In case of a software implementation, the invention may be provided as a computer program product including a computer-readable storage structure embodying computer program code (i.e., the software therein), for execution by a computer processor. Additionally, the dot designators in FIG. 3 represent that a communication system may include a plurality of source, relay and destination nodes communicating therein through a plurality of channels either directly or indirectly and possibly through other communication nodes. For instance, an antenna of a destination node may receive a signal from first and second communication nodes (e.g., relay nodes) and a feedback generator thereof may transmit a feedback signal(s), which may be different, to one or both of the first and second communication nodes to adjust an antenna weighting factor of an antenna thereof.

A more detailed view is now described by presenting an embodiment of a process to adaptively adjust antenna weighting factors applied at a relay node. As an example, a relay system with R+2 single-antenna nodes is considered wherein one source node communicates with one destination node through a set of R half-duplex relay nodes, as described by H. Bölcskei, et al., cited previously hereinabove. In a first time interval, a source node transmits a data sequence to relay nodes and, in a second time interval, the relay nodes, after performing a linear operation on noisy received sequences, forward a resulting signal to the destination node. No direct communication link between the source node and the destination node is assumed. The concept can be extended to multiple source and destination nodes with single or multiple antennas by use of an orthogonal multiple access scheme (e.g., TDMA, FDMA, CDMA, etc). Moreover, the approach can also be used with multiple-antenna relay nodes.

A transmission frame of total length N+M is defined, which includes an estimation interval of length N time instants that is time-multiplexed with a data sequence of length M. The estimation interval includes a pilot training sequence transmitted from the source node and is used to generate a feedback signal at the destination node. After each transmission frame, the feedback signal is used to update the antenna weighting factors at relay nodes. Let i in the following denote the i-th antenna weighting factor update. The actual lengths of the estimation and the data sequences are design parameters that depend on time variation of the backward and forward channel. Optimal choices of N and M allow the antenna weighting factors to quickly adapt to the time-varying nature of the channels.

The noisy pilot sequence received at each relay node is forwarded to the destination node using two different antenna weighting factors w+(r) and w_(r), where, r=1, ..., R and R denotes the r-th relay node. Specifically, certain received symbols are dedicated to be forwarded using antenna weighting factors w+(r) and w_(r), respectively. For convenience, the antenna weighting factors are stacked in vectors as w+=[w+(1), ..., w+(R)] and w_=[w_(1), ..., w_(R)] respectively. These antenna weighting factors are perturbed from the tracked transmission antenna weighting factor vector $w_i$ and can be calculated in an antenna weighting factor module 340 as in equations (1) and (2) below using a deterministic or random perturbation vector v as:

$$w+ = w_i + \beta \cdot v \qquad (1)$$

$$w\_ = w_i - \beta \cdot v \qquad (2)$$

wherein the parameter β represents the step size of the antenna weighting factor increment, and $w_i$ represents the antenna weight factor during the i-th sequence of iterations.

The perturbed antenna weighting factor vectors are kept constant during an estimation interval. Note that computation of the perturbed antenna weighting factors can be done at each relay node separately. The perturbation vector v may be generated from a random Gaussian vector or from a deterministic, orthogonal vector set. Let y+ and y_denote the received signals at the destination node corresponding to the antenna weighting factors vectors w+ and w_, respectively. These signals are used to generate a coarse feedback signal. For example, the feedback signal can be computed by estimating the received signal power P+ originating from the antenna weighting factor w+, and the received signal power P_originating from the antenna weighting factor w_. A one-bit feedback signal c can then be obtained according to equation (3)

$$c = \text{sign}\{P+ - P\_\} \qquad (3)$$

At the relay nodes, the feedback signal c is used to update the antenna weighting factors in antenna weighting factor module 340 as illustrated in equation (4):

$$w_{i+1} = w_i + \beta \cdot c \cdot v \quad (4)$$

The step-size parameter β allows adjustment of a tradeoff between speed of adaption and tracking accuracy. Moreover, if the relay nodes are able to cooperate, the parameter β may be a function of all antenna weighting factors (i.e., β(w(1), . . . , w(R))) to cooperatively influence the antenna weighting factors and thus produce a better antenna weighting factor update.

In the above description, in equation (3) the feedback signal (e.g., a power-based feedback signal) depends on the relative received power (or a difference thereof) obtained by the perturbed weights. Alternative beneficial ways of determining the feedback signal (e.g., a feedback bit) can be also constructed. For example, the signal-to-noise based feedback signal can depend on or be a function of the received signal-to-noise ratio or signal-to-noise-interference ratio that is estimated using the two perturbed weights, or any other performance measure (like resulting throughput or capacity). Moreover, in the presence of more than one source node (e.g., each transmitting a different pilot signal) the destination node can compute the total (sum) SINR/throughtput at the destination node (of any other performance metric which converts the individual performance estimates for the two source nodes to one value, which depends on perturbed weights) using the two perturbed weights and find the one that gives joint performance. This allows finding weights that enable multiplexing of multiple source nodes, essentially so that the determined weights (at relay nodes) eventually reduce the inference between the simultaneously transmitted source signals when received at a destination node (which may have more than one antenna). Here, the different source nodes can even use different relay nodes, or partially different relay nodes, or the same relay nodes.

As mentioned above and in addition to the power-based feedback signal outlined in equation (3), the results herein show that a feedback signal such as a one-bit feedback signal can also be based on signal-to-noise based (e.g., SNR-dependent) measurements. Generating a one-bit feedback signal based on SNR-measures yields a significant performance gain, since it not only allows the antenna weights to closely approach coherent combining, but also at the same time achieves close-to-optimal power allocation of the relays transmit powers.

As an example, it was shown by P. Larsson in a paper entitled, "Large-scale cooperative relaying network with optimal coherent combining under aggregate relay power constraints," in Proc. Future Telecommunication Conference (FTC), 2003, which is incorporated herein by reference, that in addition to coherent phase combination of the backward and forward channels, optimal power allocation can further improve the performance of a relay system. Optimal power allocation ensures that those relay nodes experiencing a poor backward and/or forward channel, transmit their noisy received signals only with low power to prevent harmful amplification of the dominating noise terms. Thus, the transmit power of each relay is chosen in such a way that the received SNR at the destination node is maximized. According to Larsson, however, optimal power allocation requires global CSI at each relay.

Figure 4:
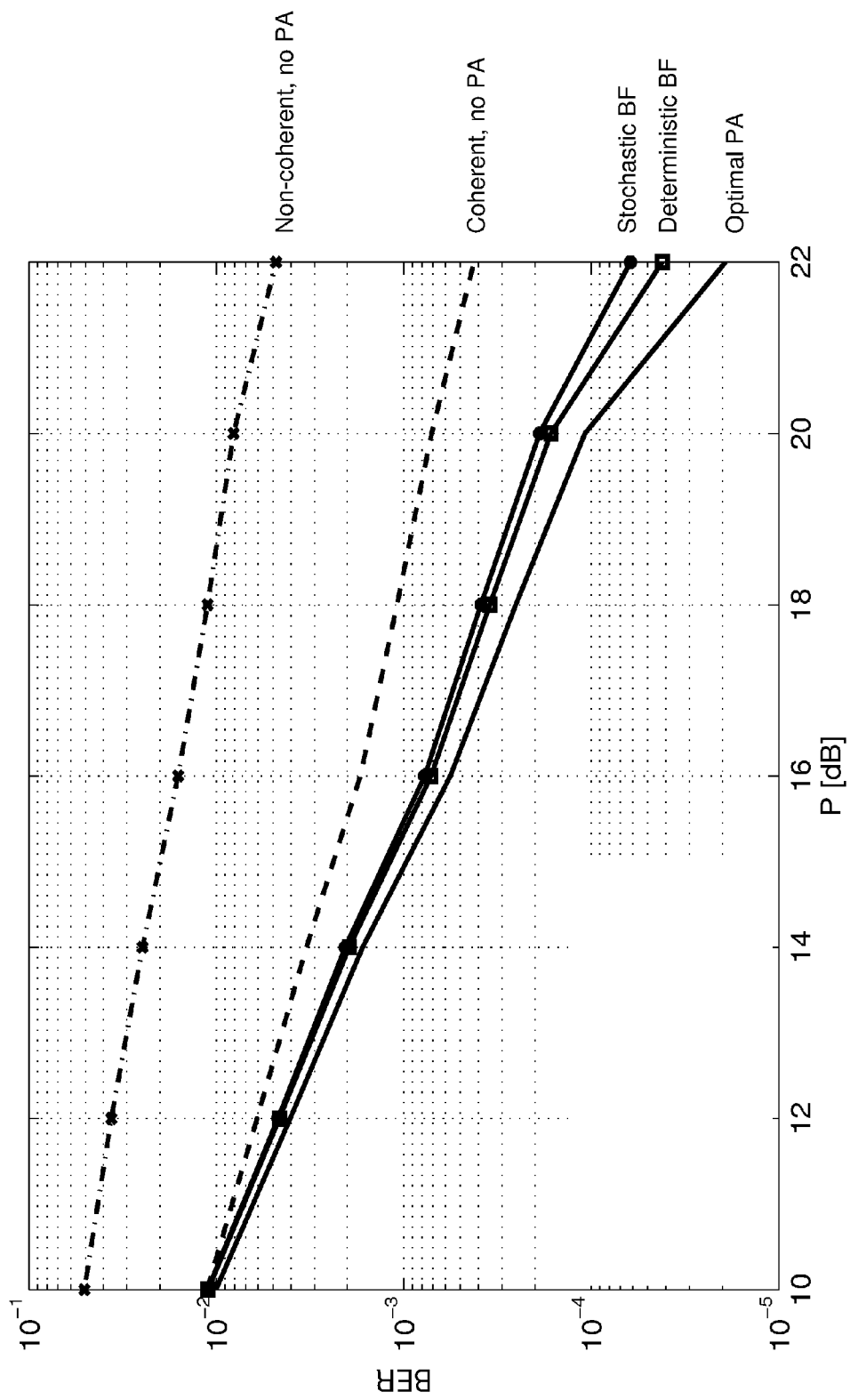
FIG. 4 illustrates a graph demonstrating that enhanced power allocation can be achieved using a learning weights method.

Referring now to FIG. 4, illustrated is a graph demonstrating that enhanced (e.g., optimal) power allocation can be achieved using a learning weights method. The key to optimal power distribution lies in SNR-dependent measurements at the destination node. Thus, instead of determining the effectiveness of the weight perturbations by measuring the received power at the destination node, it is possible to measure the received SNR. Using these SNR-dependent measurements, a one-bit feedback signal can then be obtained similar to equation (3). This approach allows for the convergence of coherent phase combining of the backward and forward channel as well as the optimal power allocation simultaneously. FIG. 4 presents bit error rate versus relay power ("P") using a one-bit feedback weight learning scheme with SNR-dependent measurements at the destination node with two relay nodes using an uncoded frame with binary phase shift keying ("BPSK") modulation. Curves are shown using a stochastic and a deterministic perturbation set (labeled "stochastic BF" and "deterministic BF," respectively) for a relay system consisting of R=2 relay nodes. For comparison, FIG. 4 illustrates the performance of optimal power allocation with coherent combining (labeled "optimal PA," see Larsson), coherent combining without power allocation (labeled "coherent, no PA") and non-coherent combining without power allocation (labeled "non-coherent, no PA"). It can be seen that the proposed method closely attains the performance of optimal power allocation and allows a significant performance gain as compared to coherent combining without power allocation.

Figure 5:
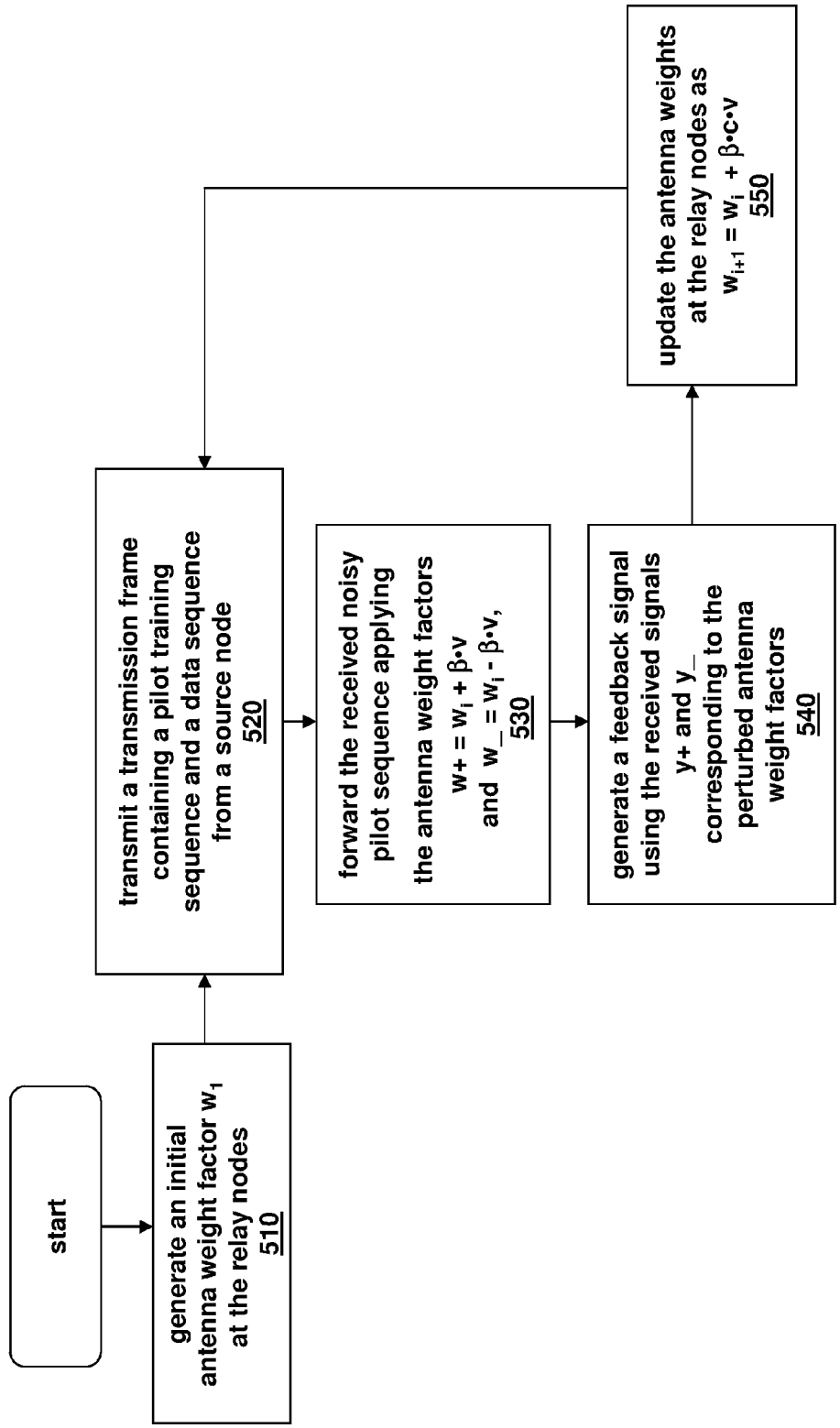
FIG. 5 illustrates a flow diagram demonstrating steps that may be performed in the operation of a communication system including a source node, one or more relay nodes with antennas controlled by antenna weighting factors, and a destination node providing feedback to adjust the antenna weighting factors.

Turning now to FIG. 5, illustrated is a flow diagram demonstrating steps that may be performed in the operation of a communication system including a source node, one or more relay nodes with antennas controlled by antenna weighting factors, and a destination node providing feedback to adjust the antenna weighting factors. The method of operating the communication system includes generating an initial antenna weight factor $w_1$ at a relay node during a step 510, and transmitting a transmission frame containing a pilot training sequence and a data sequence (e.g., a first signal) from the source node using perturbed antenna weighting factors at a step 520. The method continues by forwarding the received noisy pilot sequence by the relay node to the destination node applying the perturbed antenna weighting factors according to equations (1) and (2) at a step 530. The method continues by generating a feedback signal c (e.g., a second signal) at the destination node according to received signal power using received signals y+ and y_ corresponding to the perturbed antenna weighting factors at a step 540. The method concludes by updating the antenna weighting factors at the relay nodes according to equation (4) at a step 550, and then returning to step 520 to iteratively adjust the antenna weighting factor over a sequence of adjustment steps.

Figure 6:
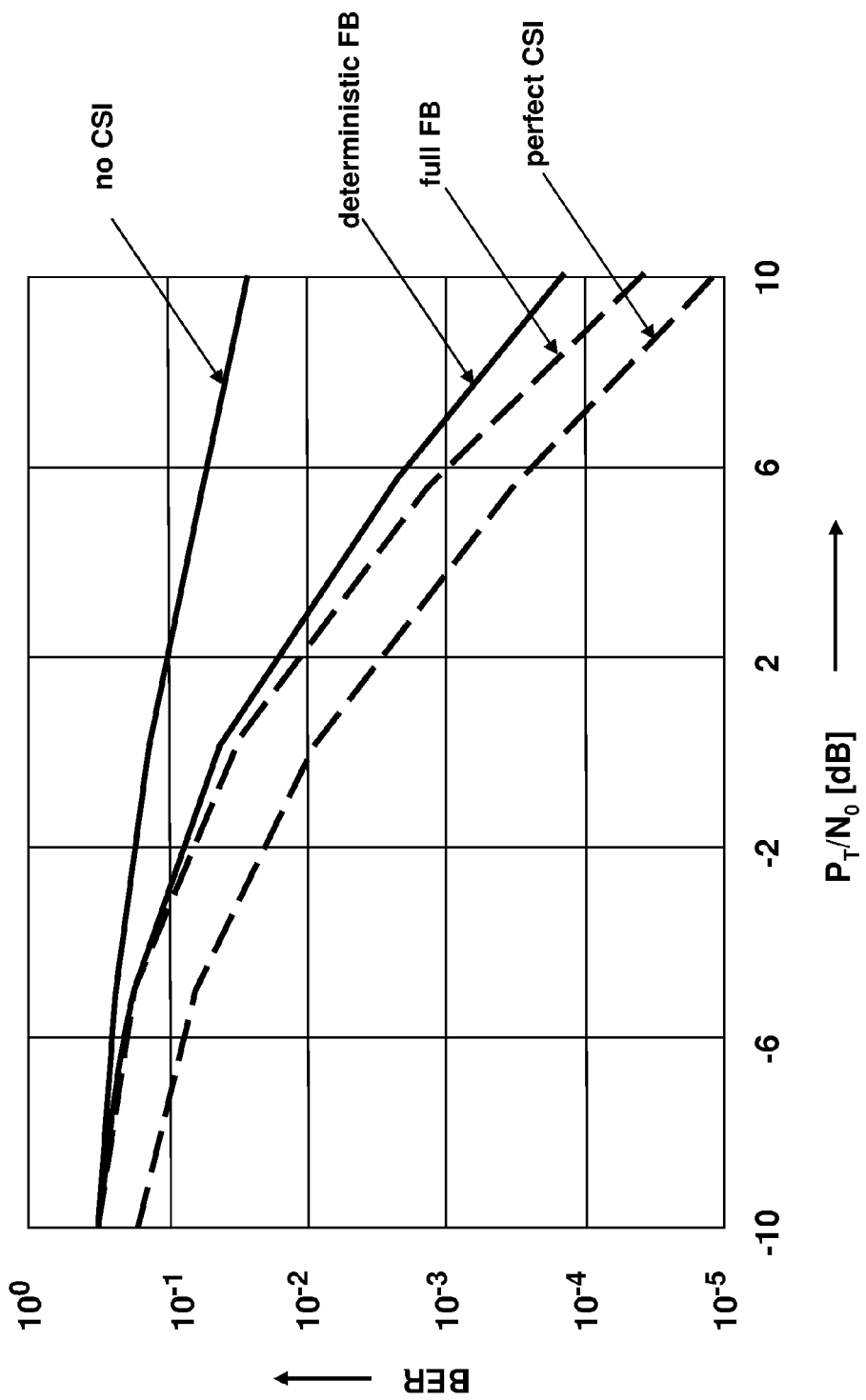
FIG. 6 illustrates a graph showing bit-error rate versus signal-to-noise ratio for a one-bit deterministic feedback antenna-weighting-factor learning scheme.

A simple experiment highlights benefits achieved by a system constructed according to an embodiment in accordance with FIG. 6. Consider a relay system wherein one source node communicates with one destination node through a set of five relay nodes, all having single antennas. Furthermore, assume single-tap Rayleigh fading backward and forward channels, and additive, zero-mean, white Gaussian noise at the relay nodes and at the destination node. A transmission frame consists of an uncoded data sequence of binary phase shift keyed ("BPSK") modulated symbols.

Referring now to FIG. 6, illustrated is a graph showing bit-error rate ("BER") versus signal-to-noise ratio ("SNR")) expressed as the ratio $P_T/N_0$, representing the ratio of total average transmit power at the relay nodes to received noise power at the destination node, in decibels ("dB"), for a one-bit deterministic feedback antenna-weighting-factor learning scheme. The one-bit deterministic feedback scheme is labeled "deterministic FB" in FIG. 6. The number of relay nodes is five, and an uncoded frame with BPSK modulation is used. In this exemplary embodiment, the perturbations applied to the antenna weighting factors at the relay nodes were chosen from a deterministic perturbation set. The SNR of the received signal at the relay nodes is fixed at 20 dB.

For comparison, a reference scheme (labeled "full FB") is illustrated in FIG. 6. In this reference scheme, the backward channel is estimated at the relay nodes transmitting dedicated pilots from the source node, and the forward channel is estimated at the destination node transmitting dedicated pilots from the relay nodes. In order to compute antenna weighting factors at the relay nodes, the full CSI of the forward channel is fed back to the relay nodes. For a fair comparison, the total pilot overhead is set equal for the deterministic feedback scheme and the reference full feedback scheme. It can be seen that the performance of the deterministic feedback scheme employing limited feedback closely approaches the performance of the full feedback scheme in relevant bit-error rates. It is noted that increasing the pilot overhead would further decrease the remaining performance gap between the two schemes.

For further comparison, extreme cases are illustrated in FIG. 6, wherein the relay nodes have perfect CSI available in order to calculate the antenna weighting factors (labeled "perfect CSI") and the case wherein no CSI is available (labeled "no CSI"). In the latter case, the received signals are noncoherently combined and, thus, there is no or little possibility to achieve a beamforming gain or a transmit diversity.

Figure 7:
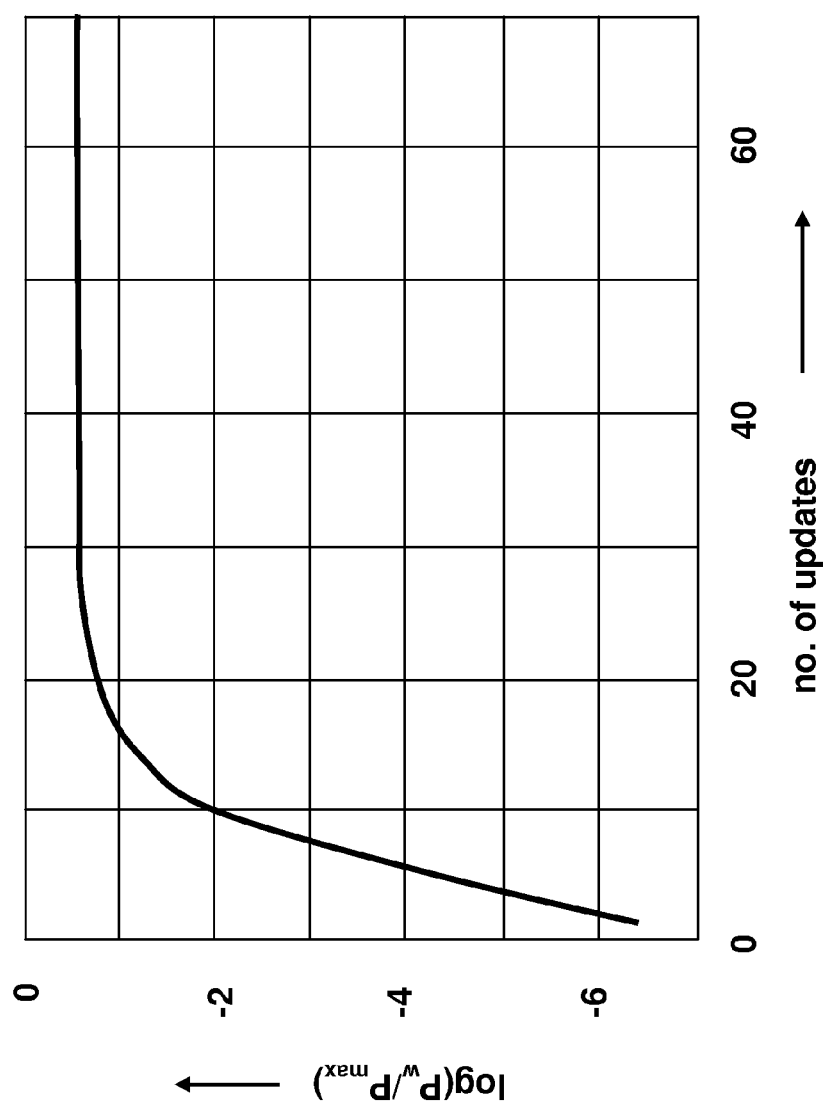
FIG. 7 illustrates a graph of convergence behavior of a one-bit deterministic feedback scheme to adjust antenna weighting factors with five relay nodes.

Turning now to FIG. 7, illustrated is convergence behavior of a one-bit deterministic feedback scheme to adjust antenna weighting factors with five relay nodes. The curve represents an averaged ratio of $P_w/P_{max}$ where $P_w$ denotes signal power at a receiver achieved by the one-bit deterministic feedback scheme, and $P_{max}$ denotes the maximum achievable signal power as a result of ideal coherent combining The results were averaged over 500 simulation runs. It can be seen that the one-bit deterministic feedback scheme closely approaches the maximum received power after only a few antenna weighting factor updates.

A feedback scheme constructed according to an embodiment is operable for any set or subset of relay node antennas, regardless of whether the antennas belong to different relay node, to a subset of one relay node with multiple antennas, or to any subset of multiple relay nodes with multiple antennas. In a cooperative wireless communication network, relay nodes can even be other portable transceivers or terminals.

The relay nodes need not be amplify-and-forward nodes, but can be, for instance, estimate-and-forward nodes, etc., even if amplify-forward has been mostly assumed herein. The relay nodes may also perform baseband operations, such as despreading and respreading, and may perform fast Fourier transforms/inverse fast Fourier transforms, etc., related to multiplexing of different sources at a relay node input or output. The use of an antenna weighting factor feedback arrangement constructed according to an embodiment may be implemented in orthogonal frequency division multiplexing ("OFDM")-type systems wherein node synchronization is relaxed up to the time-span of a cyclic prefix. If the channel is correlated in time or/and frequency, the number of pilots and the amount of feedback can be reduced by the use of interpolation techniques.

It is noted further that an antenna weighting factor feedback arrangement constructed according to an embodiment is not restricted to a specific perturbation technique, such as the one illustrated in the example above. Moreover, perturbations can be made in an analog domain or a digital domain. The speed of convergence of the antenna weighting factors (e.g., the adaption rate) and the performance of the communication system can be increased by increasing the amount of feedback transmitted to relay nodes. A feedback arrangement constructed according to an embodiment may be applied for any amount of feedback. The feedback channels defined for most wireless communication systems (e.g., Third Generation Partnership Program ("3GPP"), wideband code division multiple access ("CDMA"), etc.) and similar channels can also be used. Furthermore, pilot signals can also be multiplexed using any conventional technique, although time division multiplexing ("TDM") has been discussed herein for simplicity.

An antenna weighting factor feedback arrangement, constructed according to an embodiment, employs an initialization phase at start-up in order to produce convergence. After the initialization phase, the antenna weighting factors produced by the feedback arrangement are advantageously able to accurately track time-varying channels. It is noted further that in the case of one relay node having multiple antennas, the antenna weighting factor feedback arrangement can be optionally modified to track a long-term channel.

An antenna weighting factor adjustment process for a wireless communication system including a source node, a relay node, and a destination node has thus been described that can advantageously adjust antenna weighting factors at the relay node for improved reception performance at the destination node with reduced feedback from the destination node to the relay node. An antenna weighting factor adjustment process constructed according to an embodiment provides decentralized antenna weighting factor updates in a decentralized network. Conventional solutions provide antenna weighting factor updates only in a point-to-point arrangement. A decentralized relay network should be scalable. An increase or decrease of the number of relay nodes in the communication system can be accommodated in a procedure constructed according to an embodiment with a reasonable amount of signaling overhead, and without a major algorithm update at relay nodes. Thus, scalability of the system is feasible and readily accommodated.

The relay nodes including an antenna weighting factor adjustment process constructed according to an embodiment do not need CSI for the backward or forward channel. Thus, the relay nodes do not need to know frame pilots, etc., of the backward channel, which provides substantial simplification of communication system design. The relay nodes do not need explicit knowledge of the CSI of the backward and forward channel in order to choose the optimal antenna weights for coherent combining. Limited feedback (one-bit feedback, in the example above) can be generated at the destination node by transmitting pilots from the source node. The feedback enables the antenna weighting factor adjustment process constructed according to an embodiment to learn the correct antenna weighting factors at the relay nodes and, thus, to coherently combine the desired signal that is affected by both channels (e.g., the backward and the forward channel). It should be understood that multi-bit feedback may also be employed in a communication system with at least two relay nodes.

If CSI is provided for the backward (or forward) channel, the antenna weighting factor updates can still be used for the forward (or backward) channel to accelerate convergence of the antenna weighting factor adjustment process. Accordingly, an antenna weighting factor update process, constructed according to an embodiment, can be flexibly applied in a wireless communication system. Simulation results demonstrate reasonable speed of convergence when adapting to both backward and forward channels. Moreover, the speed of convergence and communication performance can be improved by increasing the amount of feedback transmitted to the relay nodes. Also, the speed of convergence can be improved by using CSI either at a relay node input or output. Furthermore, the antenna weighting factor adjustment process constructed according to an embodiment allows accurate tracking of slowly time-varying channels. Thus, after an initialization phase in which convergence is attained, the antenna weighting factors advantageously adaptively follow channel variations.

As described above, the exemplary embodiment provides both a method and corresponding apparatus consisting of various modules providing functionality for performing the steps of the method. The modules may be implemented as hardware (including an integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof, to adjust antenna weighting factors as described herein. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
   at least one processor; and
   at least one memory including computer program code, where the at least one memory and the computer program code are configured, with the at least one processor, to cause the apparatus to at least:
   receive, with a first antenna, a first signal from a source node and a second signal from a destination node, wherein said second signal comprises one of a power-based feedback signal and a signal-to-noise based feedback signal from said destination node;
   transmit, with a second antenna, at least a portion of said first signal with an antenna weighting factor; and
   adjust said antenna weighting factor based on at least said second signal.

2. The apparatus as recited in claim 1 wherein said second antenna is configured to transmit at least a portion of said first signal with a perturbed antenna weighting factor.

3. The apparatus as recited in claim 1 wherein said at least one memory including the computer program code is configured with the at least one processor to cause the apparatus to adjust said antenna weighting factor with a deterministic perturbation selected from an orthogonal vector set.

4. The apparatus as recited in claim 1 wherein said power-based feedback signal is based on a difference of powers obtained with more than one perturbed antenna weight at said destination node.

5. The apparatus as recited in claim 1 wherein said at least one memory including the computer program code is configured with the at least one processor to cause the apparatus to iteratively adjust said antenna weighting factor over a sequence of adjustment steps.

6. The apparatus as recited in claim 1 wherein said first and second antennas are antenna elements of a single antenna.

7. The apparatus as recited in claim 1 wherein said first signal includes a pilot training sequence.

8. The apparatus as recited in claim 1 wherein said apparatus is a relay node of said communication system.

9. The apparatus as recited in claim 1 comprising a transmitter and receiver coupled to said first and second antennas.

10. A method, comprising:
    receiving, with a communication node, a first signal from a source node and a second signal from a destination node, wherein said second signal comprises one of a power-based feedback signal and a signal-to-noise based feedback signal from said destination node;
    transmitting, with the communication node, at least a portion of said first signal with an antenna weighting factor; and
    adjusting, with the communication node, said antenna weighting factor based on at least said second signal.

11. The method as recited in claim 10 wherein said transmitting includes transmitting at least a portion of said first signal with a perturbed antenna weighting factor.

12. The method as recited in claim 10 wherein said adjusting includes adjusting said antenna weighting factor with a deterministic perturbation selected from an orthogonal vector set.

13. The method as recited in claim 10 wherein said power-based feedback signal is based on a difference of powers obtained with more than one perturbed antenna weight at said destination node.

14. The method as recited in claim 10 wherein said adjusting includes iteratively adjusting said antenna weighting factor over a sequence of adjustment steps.

15. The method as recited in claim 10 wherein said receiving and transmitting are performed in accordance with first and second antennas.

16. The method as recited in claim 10 wherein said receiving and transmitting are performed in accordance with a transmitter and receiver of a communication node.

17. An apparatus, comprising:
    at least one processor; and
    at least one memory including computer program code, where the at least one memory and the computer program code are configured, with the at least one processor, to cause the apparatus to at least:
    receive a signal from one of a first and a second communication node; and
    transmit a feedback signal to at least one of said first and said second communication node to adjust an antenna weighting factor of an antenna thereof, wherein said feedback signal comprises one of a power-based feedback signal and a signal-to-noise based feedback signal.

18. The apparatus as recited in claim 17 wherein said at least one memory including the computer program code is configured with the at least one processor to cause the apparatus to transmit said feedback signal to said first communication node and another feedback signal to said second communication node.

19. The apparatus as recited in claim 17 wherein said power-based feedback signal is based on a difference of powers obtained with more than one perturbed antenna weight.

20. A communication system, comprising:
- a source node configured to transmit a first signal including a pilot training sequence;
- a destination node configured to transmit a second signal; and
- a relay node, including:
    - a first antenna coupled to a receiver configured to receive said first signal and said second signal, wherein said second signal comprises one of a power-based feedback signal and a signal-to-noise based feedback signal from said destination node,
    - a second antenna coupled to a transmitter configured to transmit at least a portion of said first signal with an antenna weighting factor, and
    - an antenna weighting factor module coupled to said first antenna and configured to adjust said antenna weighting factor based on at least said second signal.

* * * * *